United States Patent
Sezi et al.

[11] Patent Number: 5,883,221
[45] Date of Patent: Mar. 16, 1999

[54] SYNTHESIS OF POLYBENZOXASOLE AND POLYBENZOTHIAZOLE PRECURSORS

[75] Inventors: Recai Sezi, Roettenbach; Eberhard Kuehn, Hemhofen; Hellmut Ahne, Roettenbach; Sueleyman Kocman, Forchheim, all of Germany

[73] Assignee: Siemens Aktiengesellschaft, München, Germany

[21] Appl. No.: 988,023

[22] Filed: Dec. 10, 1997

[30] Foreign Application Priority Data

Nov. 12, 1996 [DE] Germany .................. 196 51 539.4

[51] Int. Cl.$^6$ .................. C08G 65/40; C08G 63/00
[52] U.S. Cl. .................. 528/327; 528/125; 528/172; 528/173; 528/174; 528/337; 528/352; 528/353; 528/373; 528/377
[58] Field of Search .................. 528/327, 125, 528/310, 172, 173, 174, 337, 352, 353, 373, 377

[56] References Cited

U.S. PATENT DOCUMENTS

| | | | |
|---|---|---|---|
| 4,339,521 | 7/1982 | Ahne et al. | 430/192 |
| 4,395,482 | 7/1983 | Ahne et al. | 430/326 |
| 4,622,285 | 11/1986 | Ahne | 430/322 |
| 4,849,051 | 7/1989 | Ahne et al. | 156/659.1 |
| 5,021,320 | 6/1991 | Mueller et al. | 430/192 |
| 5,037,720 | 8/1991 | Khanna | 430/190 |
| 5,077,378 | 12/1991 | Mueller et al. | 528/185 |
| 5,096,999 | 3/1992 | Hellmut et al. | 528/182 |
| 5,147,961 | 9/1992 | Ahne et al. | 528/182 |

FOREIGN PATENT DOCUMENTS

| | | |
|---|---|---|
| 0 761 641 | 3/1997 | European Pat. Off. . |
| 0 761 718 | 3/1997 | European Pat. Off. . |
| OS 37 16 629 | 12/1988 | Germany . |

*Primary Examiner*—P. Hampton-Hightower
*Attorney, Agent, or Firm*—Kenyon & Kenyon

[57] ABSTRACT

In a method of synthesis of polybenzoxazole and polybenzothiazole precursors, a dicarboxylic acid or a dicarboxylaic acid ester is reacted with a bis-o-aminophenol or bis-o-aminothiophenol in a suitable solvent in the presence of an activating reagent having the following structure:

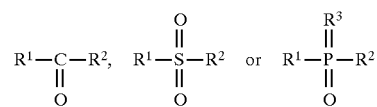

20 Claims, No Drawings

SYNTHESIS OF POLYBENZOXASOLE AND POLYBENZOTHIAZOLE PRECURSORS

FIELD OF THE INVENTION

The invention relates to a method of synthesizing polybenzoxazole precursors (poly-o-hydroxyamides) and polybenzothiazole precursors (poly-o-mercaptoamides).

BACKGROUND OF THE INVENTION

In microelectronics, high-temperature-resistant polymers are needed especially as insulation layers and dielectrics. Precursors of such polymers, such as polyimides (PI) and polybenzoxazoles (PBO) can be made photoreactive with suitable additives and can directly be structured photochemically. The precursors, which are also known as prepolymers, are converted to the corresponding polymer (PI or PBO) by a temperature treatment, thus yielding the final properties.

In contrast to most photosensitive PI precursors, photosensitive PBO precursors offer the advantage of structurability in a positive mode and the possibility of developing with an aqueous alkaline medium (see European Patent No. 23,662 and Unexamined European Patent Application No. 264,678). An important advantage of the positive structurability is the low defect density in structuring so-called "via holes," because only a fraction of the area is exposed—in comparison with systems that work negatively. In addition to having an adjusted alkali solubility, i.e., solubility in aqueous alkaline metal-ion-free developers, PBO precursors suitable for direct structuring must have a good solubility in organic solvents so that they can be applied to a substrate from a solution—by means of centrifugal or spray methods.

The most common method of synthesizing alkali-soluble PBO precursors is to react a dicarboxylic acid chloride with a suitable bis-o-aminophenol. As a rule a soluble base such as pyridine or triethylamine is added to capture the hydrogen chloride (HCl) formed in the reaction (see Unexamined European Patent Application No. 264,678 and European Patent No. 291,779). The residual chloride remaining in the PBO precursor and optionally other ions must be removed by means of ion exchangers because they can impair the functioning of microelectronic components in the long run. However, this is complicated and expensive.

A requirement that must be met in synthesis of PBO precursors is that the dicarboxylic acid or dicarboxylic acid derivative must react mainly with the amino groups of the bis-o-aminophenol (forming an amide), but there must be little or no reaction with its hydroxyl groups (forming an ester), i.e., the reaction selectivity in formation of the amide in comparison with formation of the ester must be high. If the selectivity of the reaction is not high enough, the reaction will lead to polymers with inadequate alkali solubility or to gelation, i.e., then the PBO precursor cannot be used.

Methods of chloride-free synthesis of polybenzoxazole precursors— and likewise polybenzothiazole precursors— have already been described. Thus, it is known from Unexamined European Patent Application No. 158,726 that dihydroxy- and dimercaptodiamino compounds can be reacted with a dicarboxylic acid in the presence of a carbodiimide. However, urea residues remaining in the resin due to side reactions often cause problems in this reaction. They have a negative effect on the thermal stability of the polybenzoxazole or polybenzothiazole as well as the quality of layers produced from them. In addition, the polymers synthesized by this method do not have adequate solubility in aqueous alkaline metal-ion-free developers.

An alternative chloride-free synthesis process for poly-o-hydroxyamides consists of using condensation reagents such as 1-ethoxycarbonyl-2-ethoxy-1, 2-dihydrocuinoline or dicyclohexyl carbodiimide and 1-hydroxy-1,2,3-benzotriazole to react the dicarboxylic acid with bis-o-aminophenol (see Unexamined European Patent Application No. 391,196). However, the polymers synthesized by this method also have an inadequate solubility in aqueous alkaline metal-ion-free developers.

Another method of synthesizing polybenzoxazole and polybenzothiazole precursors in a chloride-free process is proposed in Unexamined European Patent Application No. 761,718, where bis-o-aminophenols or bis-o-aminothiophenols are reacted with dicarboxylic acid derivatives in the form of (thio)esters or amides with compounds based on benzoxazole, benzothiazole and benzotriazole, i.e., with so-called activated acid derivatives, such as activated esters. Polymers synthesized in this way are soluble in aqueous alkaline metal-ion-free developers, although the dicarboxylic acid derivatives used in this process must be synthesdized seately or isolated (see Unexamined European Patent Application No. 761,641). However, this is more expensive in comparison with direct synthesis, i.e., reacting a dicarboxylic acid with a bis-o-aminophenol, for example.

Unexamined German Patent Application No. 3,716,629 discloses thermally stable positive resists based on polybenzbxazole precursors (in the form of hydroxypolyamides) and diazoquinones. In addition to the actual starting materials, triphenylphosphine and hexachloroethane are used to synthesize the PBO precursors. Thus, the synthesis is not chloride free. In addition, the resists are developed with developers containing metal-ions.

SUMMARY OF THE INVENTION

The object of this invention is to create a selective and inexpensive method of synthesis—by a direct, chloride-free method—of polybenzoxazole and polybenzothiazole precursors that are soluble in aqueous alkaline metal-ion-free developers in particular.

This is accomplished according to this invention by the fact that a dicarboxylic acid or a dicarboxylic acid ester is reacted with a bis-o-aminophenol or bis-o-aminothiophenol in a suitable solvent in the presence of an activating reagent having the following structure:

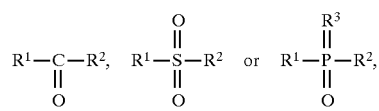

where:
(1) at least one of the $R^1$, $R^2$ and $R^3$ groups, which may be the same or different, has one of the following structures:
(a) an aliphatic structure of the following type:

where X=H or F,
$X^1$=O or S,
R=an aliphatic group (linear or branched) and/or a cycloaliphatic group having up to 10 carbon atoms, where at least 50% of the hydrogen atoms, at least 3 hydrogen atoms, must be replaced by fluorine atoms,
or a group having the structure $—(CX_2)_m—C_6X_5$ where m=0 to 5, where at least 50% of the X atoms, at least 3 X atoms, are fluorine, and where up to 3 nonvicinal carbon atoms may be replaced by O, S, CO, COO, SO$_2$, NR' or NR'—CO (where R'=H, CH$_3$ or CF$_3$) and up to two aliphatic bonds may be unsaturated; or
(b) a cyclic structure of the following type:
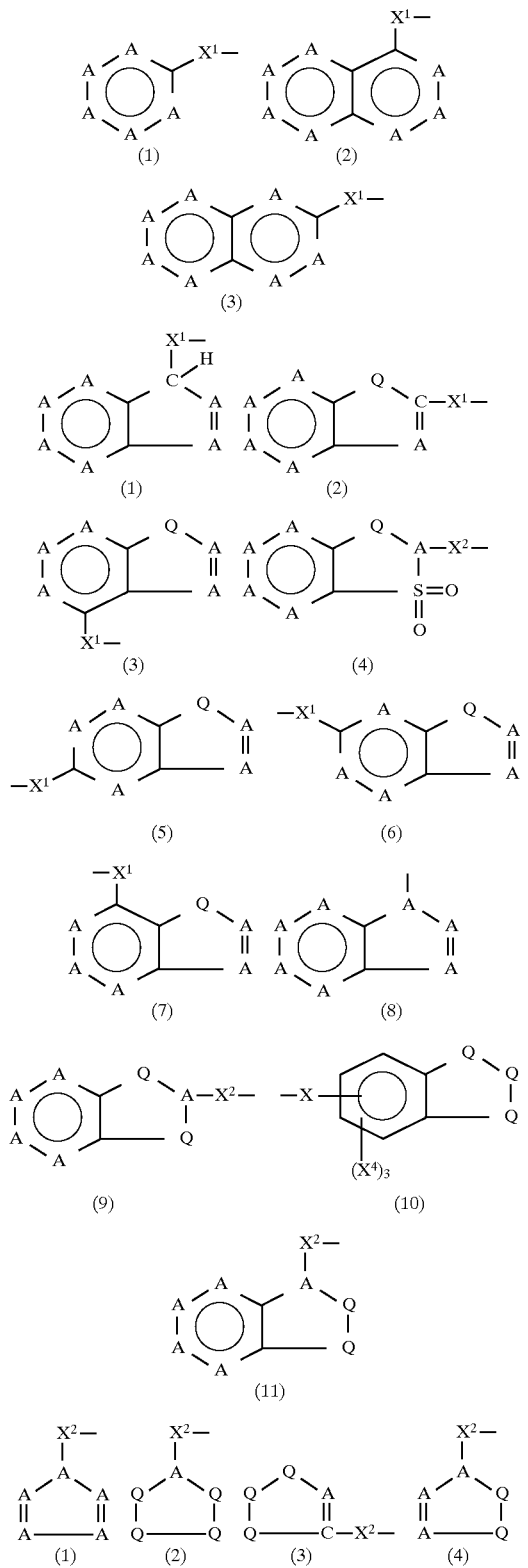
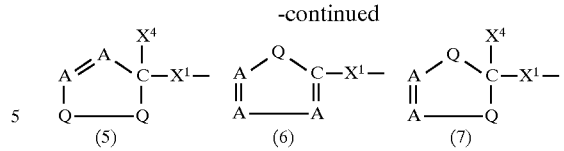
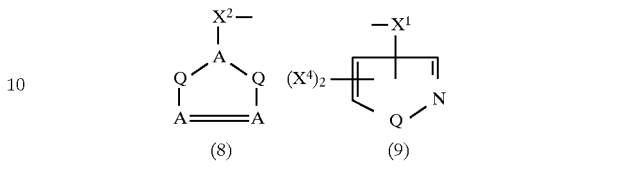
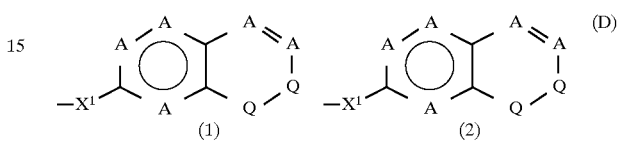
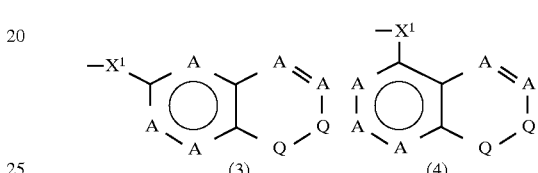
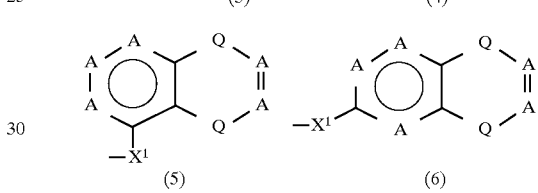
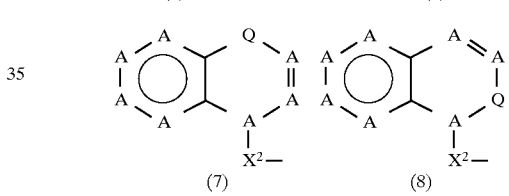
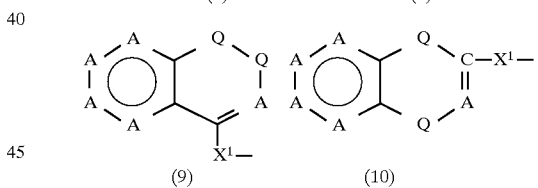
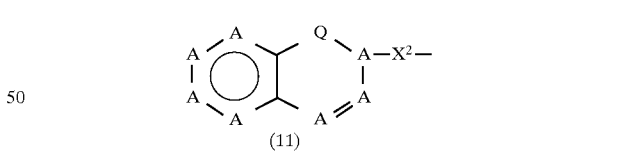
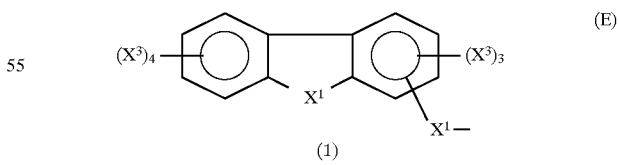
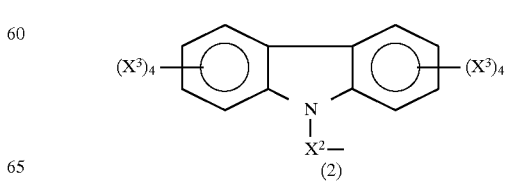

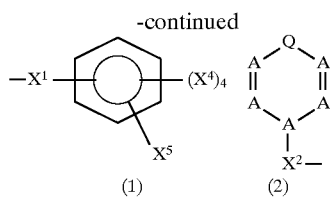

(F)

(1)   (2)

where A=CX⁴ or N
Q=C(X⁴)₂, NX⁴, O, S or CO,
  where, when there are two directly vicinal Q atoms, both may not denote O or S or one denote O and the other S, and where at least one nitrogen atom must be present, except when, in the case of directly vicinal Q atoms, one denotes O or S and the other is CO, and nitrogen atoms must not be directly vicinal in an aromatic 6-membered ring, and where the structures (C) and (F2) contain a maximum of 4 heteroatoms,
X=H or F
$X^1$=O or S
$X^2$=O, S or a direct bond
$X^3$=H, F, CN, NO₂, N(CH₃)₂, N(CF₃)₂, —(CX₂)$_m$—CX₃, —O—(CX₂)$_m$—CX₃ or —CO—(CX₂)$_m$—CX₃
  where m=0 to 5,
$X^4$=H, F, CN, NO₂, N(CH₃)₂, N(CF₃)₂
or an aliphatic group (linear or branched) and/or a cycloaliphatic group with up to 10 carbon atoms, where the hydrogen atoms may be partially or completely replaced by fluorine atoms,
or a group having the structure —(CX₂)$_m$—C₆X₅, where X=H or F, and m=0 to 5,
wherein up to 3 nonvicinal carbon atoms may be replaced by O, S, CO, COO, SO₂, NR' or NR'—CO,
  where R'=H, CH₃ or CF₃,
$X^5$=F, CN, NO₂
or an aliphatic group (linear or branched) with up to 5 carbon atoms, where at least 50% of the hydrogen atoms, at least 3 hydrogen atoms, must be replaced by fluorine atoms, and one of the carbon atoms may be replaced by O, S, CO, COO, SO₂, NR' or NR'—CO, where R'=H, CH₃ or CF₃; the remaining $R^1$, $R^2$ and $R^3$ group(s) is/are optionally an aliphatic group (linear or branched) and/or a cycloaliphatic group with up to 20 carbon atoms,
or a group of aryl or heteroaryl basis with up to 3 aromatic 5- or 6-membered rings which either form a common aromatic system or are linked together by direct bonds and/or via CH₂, CF₂, O, CO, COO, SO₂, NR' or NR'—CO,
  where R'=H, CH3 or CF₃, and they may have the following substituents:
    CN, NO₂, OCX₃, COCX₃, COOCX₃ or OCOCX₃,
or a combination of these two groups with up to 20 carbon atoms,
    where the aliphatic groups may be partially unsaturated and the hydrogen atoms may be partially or completely replaced by fluorine atoms;

(2) in the case of

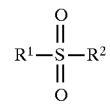

the following may hold:
$R^1$=O and $R^2$=

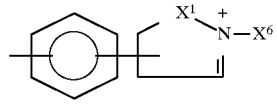

where $X^6$ is an aliphatic group (linear or branched) with up to 6 carbon atoms or a cyclopentyl or cyclohexyl group.

Especially suitable activating reagents are those having the structure:

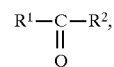

where $R^1$ and/or $R^2$ denote a 5-membered ring containing nitrogen (1 to 4 nitrogen atoms) or a similar derivative. Such activating reagents include, for example, carbonylduimadazol and N,N'-carbonyl-bis-(2-methylimidazole).

In general, the activating reagents may advantageously contain—in addition to structural elements of the types E and F1—the following structural elements (the correlation with the structures of the various types is indicated in parentheses):

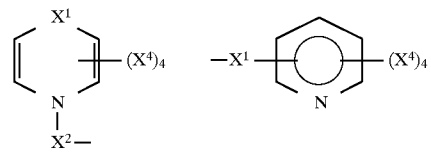

(F2)   (A1)

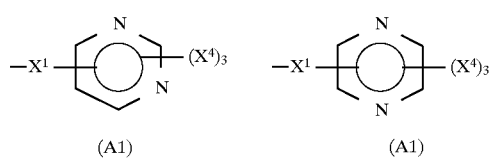

(A1)   (A1)

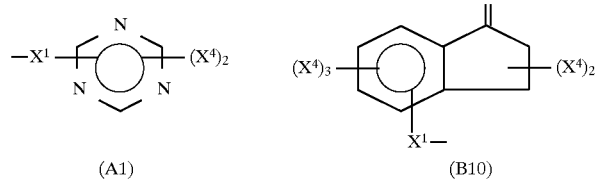

(A1)   (B10)

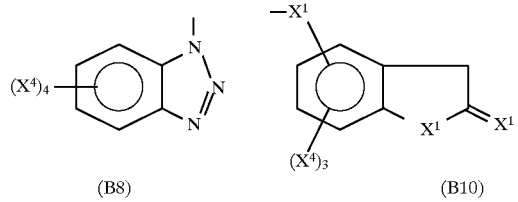

(B8)   (B10)

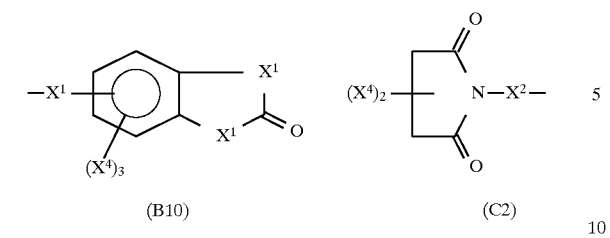
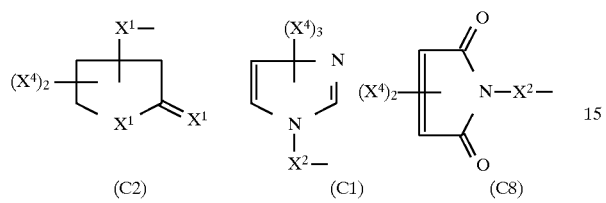
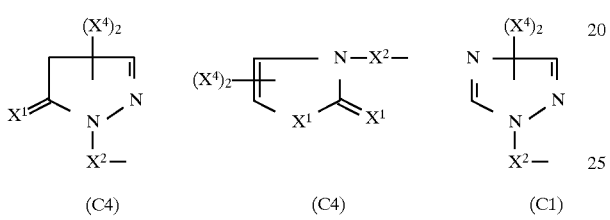
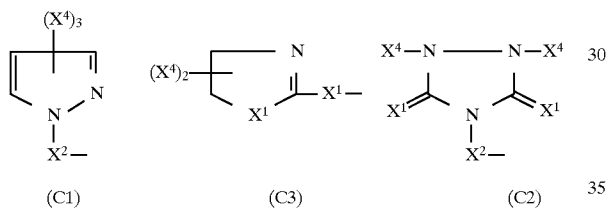
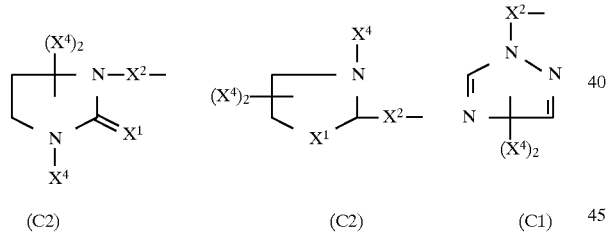
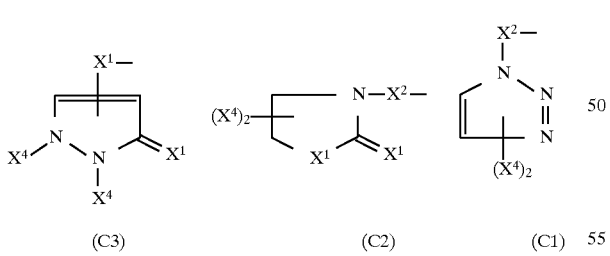
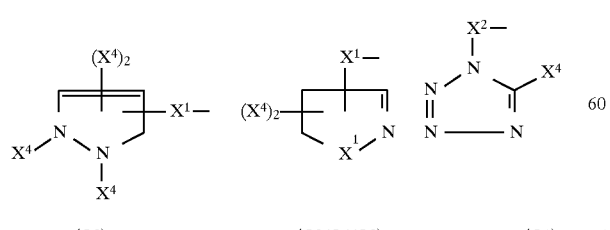
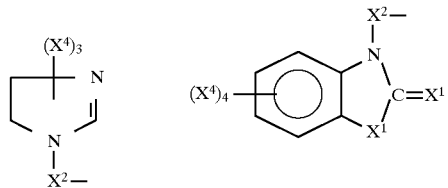
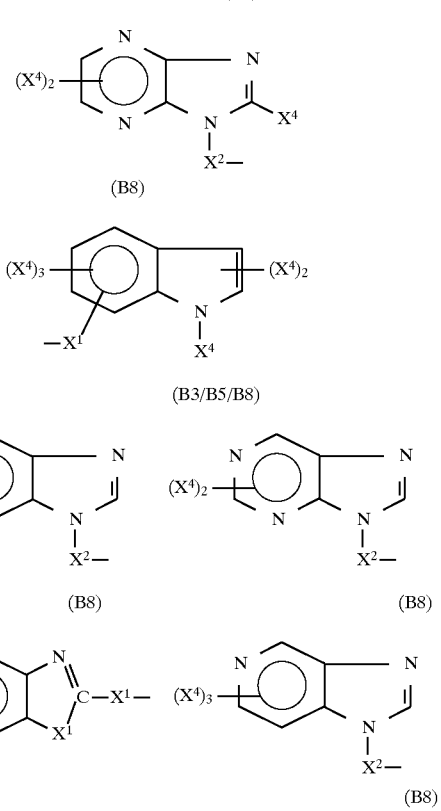
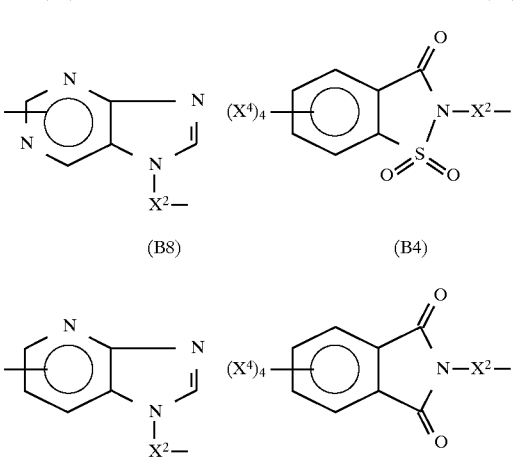

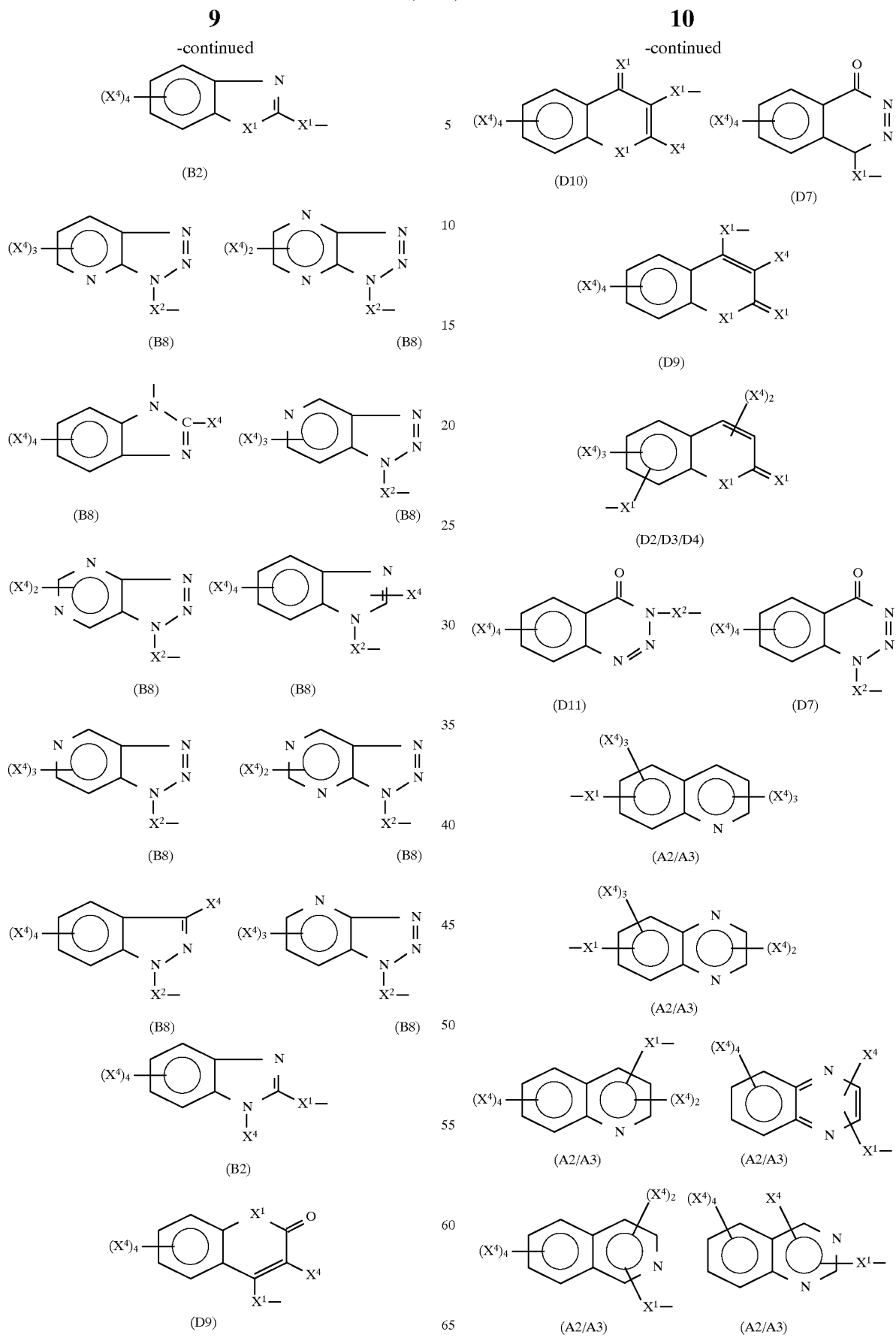

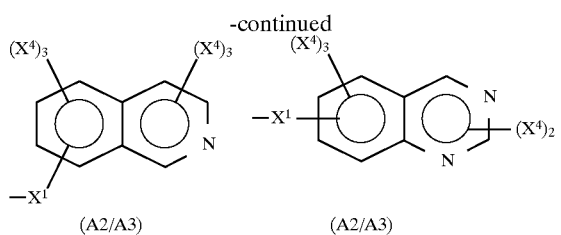

One advantage of the method according to this invention is that the dicarboxylic acids can be used directly, i.e., activated carboxylic acid derivatives such as carboxylic acid chlorides or activated esters are not carboxylic peid, necessary; however, conventional dicarboxylic acid esters can perfectly well be,used. This method also has an adequate selectivity in amide formation i.e., the polymer precursors synthesized have a good solubility in aqueous alkaline metal-ion-free developers such as 3% aqueous tetramethylammonium hydroxide solution. Furthermore, the synthesis of the polymer precursors takes place without gelation, and these precursors are readily soluble in organic solvents and can be processed well in such solvents. In addition to having good film forming properties, the polymer precursors also have an excellent adhesion to various substrates such as silicon oxide and silicon nitride or ceramics. They are very suitable basic polymers for photosensitive formulations that work in a positive mode and can be developed in an aqueous alkaline medium.

DETAILED DESCRIPTION OF THE INVENTION

In the method according to this invention, the starting components are generally introduced promptly into the reaction medium; tedious dropwise addition (of a solution) is not necessary; the sequence of addition of substances can be varied here. The activating reagent is used in stoichiometric or almost stoichiometric quantities, depending on the desired conversion or degree of polymerization. An organic base in the form of a tertiary amine, preferably pyridine or triethylamine, may advantageously be added to the reaction medium, i.e., the solution, to increase the reaction rate or yield. The reaction temperature is preferably approximately 20° C. to 150° C. The solvent is preferably N-methylpyrrolidone, dimethylacetamide or gamma-butyrolactone. In principle, however, any solvent in which the starting components are readily soluble can be used. Solvent mixtures may also be used.

After the reaction is concluded, the reaction solution may be mixed with a suitable precipitant to isolate the polymer precursor. Especially suitable precipitants include water and mixtures of water with alcohols such as ethanol and isopropanol. The precipitant may also contain a carboxylic acid such as acetic acid. Before precipitation, the end groups of the polymer precursors may be blocked with a suitable capping agent.

Another advantage of the method according to this invention is that the polymer precursors need not be isolated, i.e., the reaction solution may be directly processed further, optionally in concentrated form; the good adhesion and film-forming properties are not impaired. In combination with photoactive components based on diazoquinones, such reaction solutions that do not contain any strong bases are generally used.

The invention will be illustrated in greater detail below on the basis of practical examples.

EXAMPLE 1

Synthesis of a PBO Precursor

Under an inert gas, 2.58 g diphenylether-4,4',-dicarboxylic acid (10 mmol) are placed in a dry three-neck flask equipped with a reflux condenser and dissolved while stirring after adding 10 mL dry N-methylpyrrolidone. Next, 3.8 g N,N'-carbonyl-bis-(2-methylimidazole) (20 mmol) are added as an activating reagent and then the mixture is stirred for two hours. Then the reaction solution is mixed with 3.66 g 2,2-bis-[(3,3'-amino)-4,4',-hydroxyphenyl]-hexafluoropropane (10 mmol) and the mixture is stirred first for 24 hours at room temperature and then for 48 hours at 50° C.

EXAMPLE 2

Solubility of the PBO Precursor in an alkaline metal-ion-free developer and film formation The solution from Example 1 is placed in a plastic syringe which is provided with a 0.2 $\mu$m preliminary filter. Part of the polymer solution is applied by means of the syringe to a cleaned and dried silicon wafer, then spun in a centrifuge (model ST 146, Convac) and dried on a hot plate at 110° C. A uniform polymer film is formed on the silicon wafer. After cooling, the wafer coated with polymer film is immersed in a glass dish containing a commercially available aqueous alkaline metal-ion-free developer (NMD-W 2.38%, Tokyo Ohka). The polymer film dissolves uniformly here, i.e., without cracking or chipping. After a short period of time, the polymer film is completely dissolved in the developer. The same result is obtained when a 3% solution of tetramethylammonium hydroxide in distilled water is used instead of the commercial developer.

Another portion of the polymer solution is applied to a silicon wafer by spinning, dried at 110° C. and then tempered at 350° C. under nitrogen in a tempering furnace (Sirius Junior, LP Thermtech AG), forming a uniform PBO film with a high temperature resistance.

EXAMPLE 3

Synthesis of a PBO Precursor and Film Formation

According to Example 1, a PBO precursor is synthesized and the solvent is distilled off in vacuo after the reaction is concluded. The remaining polymer (PBO precursor) is dissolved in ethyl acetate, then extracted four times with water and the ethyl acetate is distilled off. The remaining polymer is dissolved in 12 g diethylene glycol monoethyl ether and tested according to Example 2. The same results were obtained.

EXAMPLE 4

Synthesis of a PBO Precursor and Photostructuring

A PBO precursor is synthesized according to Example 3. After distilling off the ethyl acetate, the remaining polymer is dissolved together with 1.2 g of a diester of naphthoquinonediazide-5-sulfonic acid and bisphenol A (as a photoactive component) in 15 g N-methylpyrrolidone. This resist solution is then applied to a silicon wafer according to Example 2 and dried. Then it is contact printed with an Hg/Xe lamp through a mask, developed with the NMD-W developer (diluted 1:1 with water) and tempered at 350° C.; the film thickness is then 1.5 $\mu$m. This yields structures with a resolution of up to 1 $\mu$m and a high temperature resistance.

EXAMPLE 5

Synthesis of a PBO Precursor

Under an inert gas, 6.15 g N,N'-carbonyldiimidazole (38 mmol) as the activating reagent and 3.0 g isophthalic acid (18 mmol) are placed in a dry, three-neck flask equipped with a reflux condenser; after adding 50 mL dry N-methylpyrrolidone, the mixture is stirred for 2 hours at 60° C. Then 7.4 g 2,2-bis-[(3,3'-amino)-4,4'-hydroxyphenyl]-hexafluoropropane (20 mmol) are added and then stirred for 27 hours at 60° C. Then 0.05 g norbornene-endo-2,3-dicarboxylic acid anhydride (0.3 mmol) are added as a capping agent, and then the heat source (oil bath) is removed and the mixture stirred for 6 hours. Then the reaction solution is filtered through a folded filter and precipitated in a mixture of isopropanol and water (precipitant). The precipitated polymer is filtered with suction through a Büchner funnel, washed twice with precipitant, transferred to a tared glass dish and dried first at 50° C./10 mbar and then at 50° C./$10^{-2}$ mbar; the yield is 8.7 g.

EXAMPLE 6

Synthesis of a PBO Precursor

Under an inert gas, 5.2 g N,N'-disuccinimidyl carbonate (20.4 mmol) as the activating reagent and 2.5 g diphenylether-4,4'-dicarboxylic acid (9.7 mmol) are placed in a dry, three-neck flask equipped with a reflux condenser; after adding 42 mL dry N-methylpyrrolidone, the mixture is stirred first for 1 hour at room temperature and then for 5 hours at 70° C. Next 3.95 g 2,2-bis-[(3,3'-amino)-4,4'-hydroxyphenyl]-hexafluoropropane (10.8 mmol) are added and then the temperature is increased to 90° C. and stirred for 46 hours Then the heat source (oil bath) is removed, and after reaching a temperature of 60° C., 0.026 g norbornene-endo-2,3-dicarboxylic acid anhydride (0.16 mmol) is added as the capping agent; then the mixture is stirred for 16 hours. Subsequently the reaction solution is filtered through a folded filter and precipitated in a mixture of isopropanol and water (precipitant). The precipitated polymer is filtered with suction through a Büchner funnel, washed twice with precipitant, transferred to a tared glass dish and dried first at 50° C./10 mbar and then at 50° C./$10^{-2}$ mbar; the yield is 5.2 g.

Two grams of the polymer produced in this way are dissolved in 6 g gamma-butyrolactone and tested according to Example 2. The same results are obtained.

EXAMPLE 7

Synthesis of a PBO Precursor

Under an inert gas, 5.3 g bis-(4-nitrophenyl) carbonate (17.4 mmol) as the activating reagent and 2.1 g diphenylether-4,4'-dicarboxylic acid (8.1 mmol) are placed in a dry three-neck flask with a reflux condenser; after adding 40 mL dry N-methylpyrrolidone, the mixture is stirred for 2 hours at 70° C. Then 3.3 g 2,2-bis-[(3,3'amino)-4,4'-hydroxyphenyl]-hexafluoropropane (9 mmol) are added and the temperature is raised to 120° C. and the mixture is stirred for 40 hours. After cooling to room temperature, the reaction solution is filtered through a folded filter and precipitated in a mixture of isopropanol and water (precipitant). The precipitated polymer is filtered with suction through a Büchner funnel, washed twice with precipitant, transferred to a tared glass dish and dried first at 50° C./10 mbar, then at 50° C./$10^{-2}$ mbar; the yield is 4.6 g.

EXAMPLE 8

Synthesis of a PBO Precursor

Under an inert gas, 2.0 g pyridine-2,6-dicarboxylic acid (12 mmol), 4.4 g 2,2-bis-[(3,3'-amino)-4,4'-hydroxyphenyl]-hexafluoropropane (12 mmol) and 2.55 g triethylamine (25.2 mmol) are placed in a dry three-neck flask with a reflux condenser; after adding 20 mL dry N-methylpyrrolidone, the mixture is stirred for 15 minutes at room temperature. Then 9.3 g (25.2 mmol) of an activating reagent,prepared by reacting 4-nitrobenzenesulfonyl chloride with pentafluorophenol (molar ratio 1:1) in dry acetonitrile under an inert gas, are added; then the mixture is stirred for 28 hours at 90° C. After cooling, the reaction solution is mixed with 20 mL N-methylpyrrolidone, filtered through a folded filter and precipitated in a mixture of isopropanol and water (precipitant). The precipitated polymer is filtered with suction through a Büchner funnel, washed twice with precipitant, transferred to a tared glass dish and dried first at 50° C./10 mbar and then at 50° C./$10^{-2}$ mbar; the yield is 5.3 g.

EXAMPLE 9

Synthesis of a PBO Precursor

Under an inert gas, 2.3 g isophthalic acid (14 mmol), 5.7 g 2,2-bis-[(3,3'-amino)-4,4'-hydroxyphenyl]-hexafluoropropane (15.5 mmol) and 3.0 g triethylamine (30 mmol) are placed in a dry, three-neck flask with a reflux condenser; after adding 42 mL dry N-methylpyrrolidone, the mixture is stirred for 15 minutes at room temperature. Then 12.6 g (29.5 mmol) of an activating reagent,prepared by reacting sulfuryl chloride with o-benzoic acid sulfimide (molar ratio 1:2) in dry acetonitrile under an inert gas,are added; the mixture is then stirred for 48 hours at 70° C. After cooling, the reaction solution is filtered through a folded filter and precipitated in a mixture of isopropanol and water (precipitant) The precipitated polymer is filtered with suction through a Büchner funnel, washed twice with precipitant, transferred to a tared glass dish and dried first at 50° C./10 mbar and then at 50° C./$10^{-2}$ mbar; the yield is 5.6 g.

EXAMPLE 10

Synthesis of a PBO Precursor

Under an inert gas, 2.3 g isophthalic acid (14 mmol), 5.7 g 2,2-bis-[(3,3'-amino)-4,4'-hydroxyphenyl]-hexafluoropropane (15.5 mmol) and 3.0 g triethylamine (30 mmol) are placed in a dry, three-neck flask with a reflux condenser; after adding 60 mL dry N-methylpyrrolidone, the mixture is stirred for 15 minutes at room temperature. Then 10.5 g (30 mmol) of an activating reagent, prepared by reacting 4-nitrobenzenesulfonyl chloride with 2-mercaptobenzothiazole (molar ratio 1:1) in dry acetonitrile under an inert gas,are added; the mixture is then stirred for 70 hours at 80° C. After cooling, the reaction solution is filtered through a folded filter and precipitated in a mixture of isopropanol and water (precipitant). The precipitated polymer is filtered with suction through a Buchner washed twice with precipitant, transferred to a tared glass dish and dried first at 50° C./10 mbar and then at 50° C./$10^{-2}$ mbar; the yield is 4.2 g.

EXAMPLE 11

Synthesis of a PBO Precursor

Under an inert gas, 3.1 g diphenylether-4,4'-dicarboxylic acid (12 mmol) and 2.7 g triethylamine (27 mmol) are dissolved in 16 mL dry N-methylpyrrolidone at room temperature in a dry, three-neck flask with a reflux condenser. Then 8.0 g (27 mmol) of an activating reagent, prepared by reacting sulfuryl chloride with 2-mercapto-5-methyl-1,3,4-thiadiazole (molar ratio 1:2) in dry acetonitrile under an inert gas, are added; then the mixture is stirred for 30 minutes. Next 4.9 g 2,2-bis-[(3,3'-amino)-4,4'-hydroxyphenyl]-hexafluoropropane (13 mmol) are added, then the mixture is stirred first for 1 hour at room temperature and then for 72 hours at 100° C.; then the heat source (oil bath) is removed. On reaching a temperature of 60° C., 0.1 g norbornene-endo-2,3-dicarboxylic acid anhydride (0.6 mmol) is added as the capping agent, and then the mixture is stirred for 6 hours. The reaction solution is filtered through a folded filter and precipitated in a mixture of isopropanol and water (precipitant). The precipitated polymer is filtered with suction through a Büchner funnel, washed twice with precipitant, transferred to a tared glass dish and dried first at 50° C./10 mbar, then at 50° C./10$^{-2}$ mbar; the yield is 4.8 g.

EXAMPLE 12

Synthesis of a PBO Precursor

Under an inert gas, 3.6 g diphenyl ether-4,4'-dicarboxylic acid (14 mmol), 5.1 g 2,2-bis-[(3,3'-amino)-4,4',-hydroxyphenyl]-hexafluoropropane (14 mmol), 3.0 g triethylamine (30 mmol) and 8 mL dry N-methylpyrrolidone are placed in a dry three-neck flask with a reflux condenser; then the temperature is raised to 60° C. while stirring. Next 12 mL more N-methylpyrrolidone and 12.3 g (29 mmol) of an activating reagent, prepared by reacting phosphoric acid mono-(4-nitrophenyl ester) dichloride with 2-mercapto-2-thiazoline (molar ratio 1:2) in dry acetonitrile under an inert gas, are added while stirring; then the temperature is raised to 90° C. and the mixture is stirred for 48 hours. After cooling to room temperature, the reaction solution is filtered through a folded filter and precipitated in a mixture of isopropanol, acetic acid and water (precipitant). The precipitated polymer is filtered with suction through a Büchner funnel, washed twice with precipitant, transferred to a tared glass dish and dried first at 50° C./10 mbar, then at 50° C./10$^{-2}$ mbar; the yield is 7.2 g.

EXAMPLE 13

Synthesis of a PBO Precursor

Under an inert gas, 5.1 g isophthalic acid (31 mmol), 6.5 g triethylamine (65 mmol) and 26 g (65 mmol) of an activating reagent, prepared by reacting phosphorus oxychloride with 2-mercapto-2-thiazoline (molar ratio 1:3) in dry acetonitrile under an inert gas, are placed in a dry three-neck flask with a reflux condenser. Then, 108 mL dry N-methylpyrrolidone are added at room temperature, then the temperature is raised to 60° C. while stirring. After 30 minutes, 12.5 g 2,2-bis-[(3,3'-amino)-4,4'-hydroxyphenyl]-hexafluoropropane (34 mmol) are added while stirring, then the mixture is stirred for 24 hours at 60° C. Then 0.08 g norbornene-endo-2,3-dicarboxylic acid anhydride (0.5 mmol) are added as the capping agent, the heat source (oil bath) is removed and the mixture is stirred for 6 hours. The reaction solution is mixed with 20 mL N-methylpyrrolidone, filtered through a folded filter and precipitated in a mixture of isopropanol and water (precipitant). The precipitated polymer is filtered with suction through a Büchner funnel, washed twice with precipitant, transferred to a tared glass dish and dried first at 50° C./10 mbar, and then at 50° C./10$^{-2}$ mbar; yield is 16 g.

EXAMPLE 14

Synthesis of a PBO Precursor

Under an inert gas, 4.0 g isophthalic acid (24 mmol), 5.1 g triethylamine (51 mmol) and 9.1 g 2,2-bis-[(3,3'-amino)-4,4'-hydroxyphenyl]-hexafluoropropane (25 mmol) are placed in a dry three-neck flask with a reflux condenser. To this are added 192 mL dry N-methylpyrrolidone at room temperature, and then the mixture is stirred. After 30 minutes, 17.7 g (51 mmol) of an activating reagent, prepared by reacting phosphoric acid diphenyl ester chloride with 2-mercapto-2-thiazoline (molar ratio 1:1) in dry acetonitrile under an inert gas, are added while stirring; then the temperature is raised to 90° C. and the mixture is stirred for 42 hours at 90° C. After cooling to room temperature, the reaction solution is filtered through a folded filter and precipitated in a mixture of isopropanol and water (precipitant). The precipitated polymer is filtered with suction through a Büchner funnel, washed twice with precipitant, transferred to a tared glass dish and dried first at 50° C./10 mbar, then at 50° C./10$^{-2}$ mbar; the yield is 12 g.

EXAMPLE 15

Synthesis of a PBO Precursor

Under an inert gas, 2.7 g diphenylether-4,4'-dicarboxylic acid (10.5 mmol), 2.1 g triethylamine (21 mmol) and 5.25 g N-ethyl-5-phenylisoxazolium-3'-sulfonate (21 mmol) as the activating reagent are placed in a dry three-neck flask; after adding 30 mL dry acetonitrile, the mixture is stirred for 2 hours at room temperature. Then 3.8 g 2,2-bis-[(3,3'-amino)-4,4'-hydroxyphenyl]-hexafluoropropane (10.4 mmol) are added, and the mixture is stirred for 96 hours at room temperature. Next 180 mL distilled water are added to the reaction solution while stirring, then the precipitated polymer is filtered with suction through a Büchner funnel, washed twice with distilled water, transferred to a tared glass dish and dried first at 50° C./10 mbar, then at 50° C./10$^{-2}$ mbar; the yield is 5.4 g.

EXAMPLE 16

Synthesis of a PBO Precursor

Under an inert gas, 2.95g diphenylether-4,4'-dicarboxylic acid (11.4 mmol), 4.6 g 2,2-bis-[(3,3'-amino)-4,4'-hydroxyphenyl]-hexafluoropropane (12.6 mmol), and 2.4 g triethylamine (24 mmol) are placed in a dry three-neck flask with a reflux condenser; after adding 31 mL dry N-methylpyrrolidone, the mixture is stirred for 30 minutes at room temperature. Then 8.26 g (24 mmol) of an activating reagent, preparing by reacting phosphorus oxychloride with 2,2,2-trifluoroethanol (molar ratio 1:3) in dry acetonitrile under an inert gas, are added; then the temperature is raised to 100° C. and the mixture is stirred for 72 hours. Then the heat source (oil bath) is removed, and on reaching a temperature of 60° C., 0.03 g norbornene-endo-2,3-dicarboxylic acid anhydride (0.18 mmol) is added as a capping agent; the mixture is then stirred for 6 hours. After cooling to room temperature, the reaction solution is filtered through a folded filter and precipitated in a mixture of isopropanol and water (precipitant). The precipitated polymer is filtered with suction through a Büchner funnel, washed twice with precipitant, transferred to a tared glass dish and dried first at 50° C./10 mbar, then at 50° C./10$^{-2}$ mbar; the yield is 6.5 g.

What is claimed is:

1. A method of synthesizing polybenzoxazole precursors and/or polybenzothiazole precursors, comprising reacting a dicarboxylic acid or a dicarboxylic acid ester with a bis-o-aminophenol or bis-o-aminothiophenol in a solvent in the presence of an activating reagent having the following structure:

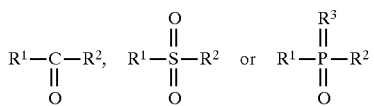

where:

(1) at least one of the $R^1$, $R^2$ and $R^3$ groups, which are the same or different, has one of the following structures:
  (a) an aliphatic structure:

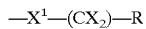

where
  X=H or F,
  $X^1$=O or S,
  R an aliphatic group and/or a cycloaliphatic group having up to 10 carbon atoms, where at least 50% of the hydrogen atoms, at least three hydrogen atoms, are replaced by fluorine atoms, or a group having the structure $-(CX_2)_m-C_6X_5$
    where m=0 to 5, where at least 50% of the X atoms, at least 3 X atoms, are fluorine, and where from zero to 3 nonvicinal carbon atoms are replaced by O, S, CO, COO, $SO_2$, NR' or NR'—CO (where R'=H, $CH_3$ or $CF_3$) and from zero to two aliphatic bonds are unsaturated;
  (b) a cyclic structure:

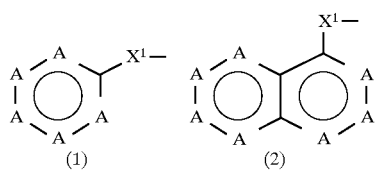
(A)

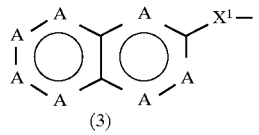

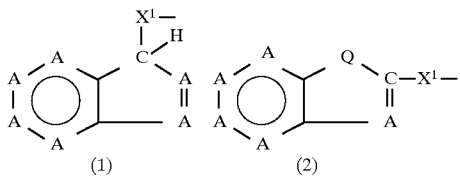
(B)

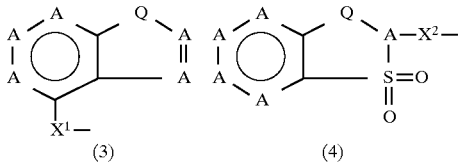

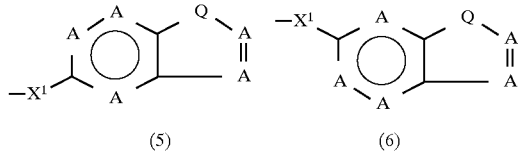

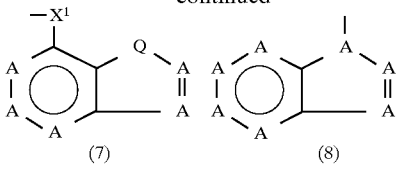
-continued

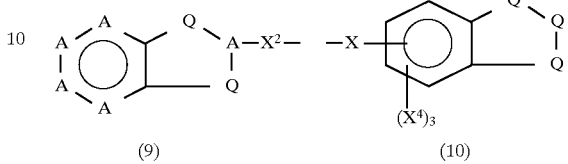

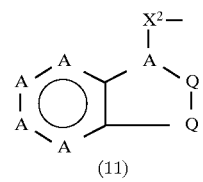

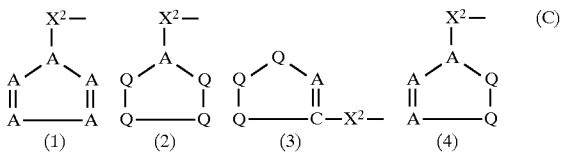
(C)

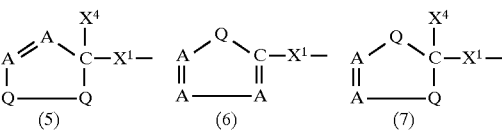

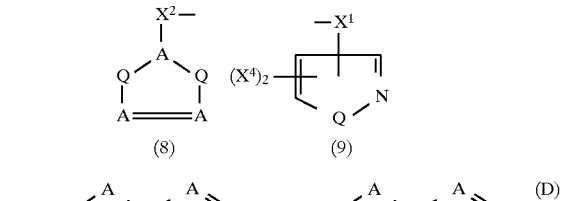

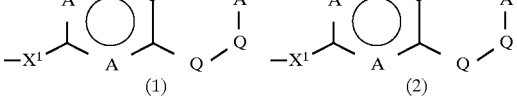
(D)

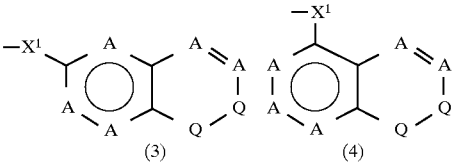

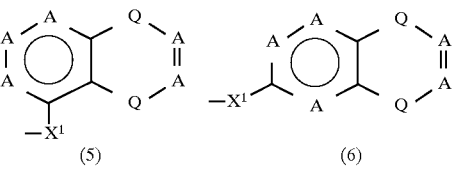

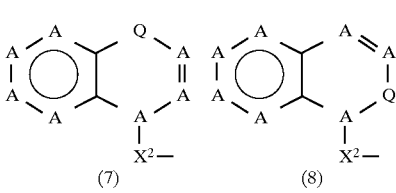

-continued (9)

(10)

(11)

(E)

(1)

(2)

(F)

(1)

(2)

where
A=CX$^4$ or N
Q=C(X$^4$)$_2$, NX$^4$, O, S or CO,
  where, when there are two directly vicinal Q atoms, they do not both denote O or S, or one denote O and the other S, and where at least one nitrogen atom is present, except when in the case of directly vicinal Q atoms one denotes O or S and the other denotes CO, and nitrogen atoms are not directly vicinal in an aromatic 6-membered ring, and where the structures (C) and (F2) contain a maximum of 4 heteroatoms,
X=H or F
X$^1$=O or S
X$^2$=O, S or a direct bond
X$^3$=H, F, CN, N$_2$, N(CH$_3$)$_2$, N(CF$_3$)$_2$, —(CX$_2$)$_m$—CX$_3$, —O—(CX$_2$)$_m$CX$_3$ or —CO—(CX$_2$)$_m$—CX$_3$
  where m=0 to 5,
X$^4$=H, F, CN, NO$_2$, N(CH$_3$)$_2$, N(CF$_3$)$_2$ or an aliphatic and/or cycloaliphatic group with up to 10 carbon atoms, where from zero to all the hydrogen atoms are replaced by fluorine atoms, or a group having the structure —(CX$_2$)$_m$—C$_6$X$_5$,
  where X=H or F and m=0 to 5,
  where from zero to 3 nonvicinal carbon atoms are replaced by O, S, CO, COO, SO$_2$, NR' or NR'—CO
  where R'=H, CH$_3$ or CF$_3$,
X$_5$=F, CN, NO$_2$ or an aliphatic group with up to 5 carbon atoms where at least 50% of the hydrogen atoms, at least 3 hydrogen atoms, are replaced by fluorine atoms, and none or one of the carbon atoms is replaced by O, S, CO, COO, SO$_2$, NR' or NR' —CO, where R'=H, CH$_3$ or CF$_3$;
the remaining R$^1$, R$^2$ and R$^3$ group(s) is/are optionally an aliphatic and/or cycloaliphatic group with up to 20 carbon atoms,
or a group on an aryl or heteroaryl basis with up to 3 aromatic 5- or 6-membered rings which either form a common aromatic system or are linked to each other by direct bonds and/or via CH$_2$, CF$_2$, O, CO, COO, SO$_2$, NR' or NR'—CO, where R'=H, CH$_3$ or CF$_3$, and optionally have the following substituents:
  CN, NO$_2$, OCX$_3$, COCX$_3$, COOCX$_3$ or OCOCX$_3$,
or a combination of these 2 groups with up to 20 carbon atoms,
where the aliphatic groups are optionally partially unsaturated, and from zero to all of the hydrogen atoms are replaced by fluorine atoms;
(2) in the case of $$R^1-\overset{\overset{O}{\|}}{\underset{\underset{O}{\|}}{S}}-R^2$$

R$^1$ and R$^2$ are optionally:
R$^1$=O$^-$ and R$^2$= where X$^6$ is an aliphatic group with up to 6 carbon atoms or a cyclopentyl or cyclohexyl group.

2. The method according to claim 1, wherein an activating reagent having the structure $$R^1-\overset{\overset{}{C}}{\underset{\underset{O}{\|}}{}}-R^2$$

is used, where R$^1$ and/or R$^2$ denote a 5-membered ring containing nitrogen or a corresponding derivative.

3. The method according to claim 1, wherein the activating reagent is used in about a stoichiometric amount.

4. The method according to claim 2, wherein the activating reagent is used in about a stoichiometric amount.

5. The method according to claim 1, wherein a tertiary amine is added to the solution.

6. The method according to claim 5, wherein the tertiary amine comprising pyridine or triethylamine is added to the solution.

7. The method according to claim 2, wherein a tertiary amine is added to the solution.

8. The method according to claim 7, wherein the tertiary amine comprising pyridine or triethylamine is added to the solution.

9. The method according to claim 3, wherein a tertiary amine is added to the solution.

10. The method according to claim 9, wherein the tertiary amine comprising pyridine or triethylamine is added to the solution.

11. The method according to claim 4, wherein a tertiary amine is added to the solution.

12. The method according to claim 11, wherein the tertiary amine comprising pyridine or triethylamine is added to the solution.

13. The method according to claim 1, wherein the reaction is performed at a temperature between 20° C. and 150° C.

14. The method according to claim 2, wherein the reaction is performed at a temperature between 20° C. and 150° C.

15. The method according to claim 3, wherein the reaction is performed at a temperature between 20° C. and 150° C.

16. The method according to claim 4, wherein the reaction is performed at a temperature between 20° C. and 150° C.

17. The method according to claim 1, wherein N-methylpyrrolidone, dimethylacetamide or gamma-butyrolactone is used as the solvent.

18. The method according to claim 2, wherein N-methylpyrrolidone, dimethylacetamide or gamma-butyrolactone is used as the solvent.

19. The method according to claim 3, wherein N-methylpyrrolidone, dimethylacetamide or gamma-butyrolactone is used as the solvent.

20. The method according to claim 4, wherein N-methylpyrrolidone, dimethylacetamide or gamma-butyrolactone is used as the solvent.

* * * * *